W. F. FINTEL.
SEED POTATO CUTTER.
APPLICATION FILED MAY 31, 1921.
1,435,828.
Patented Nov. 14, 1922.
2 SHEETS—SHEET 1.
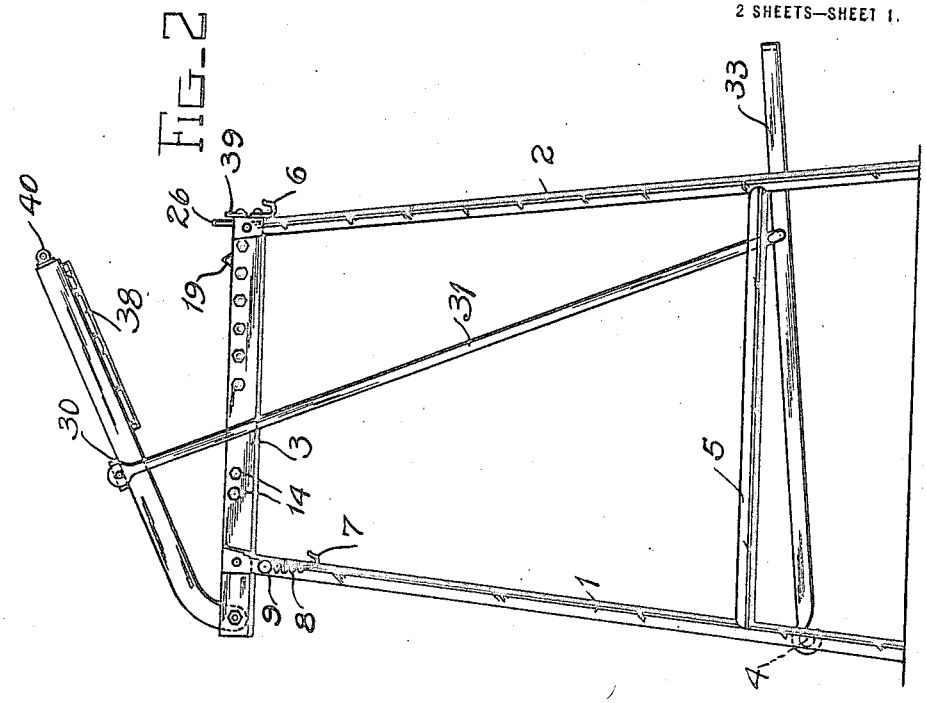
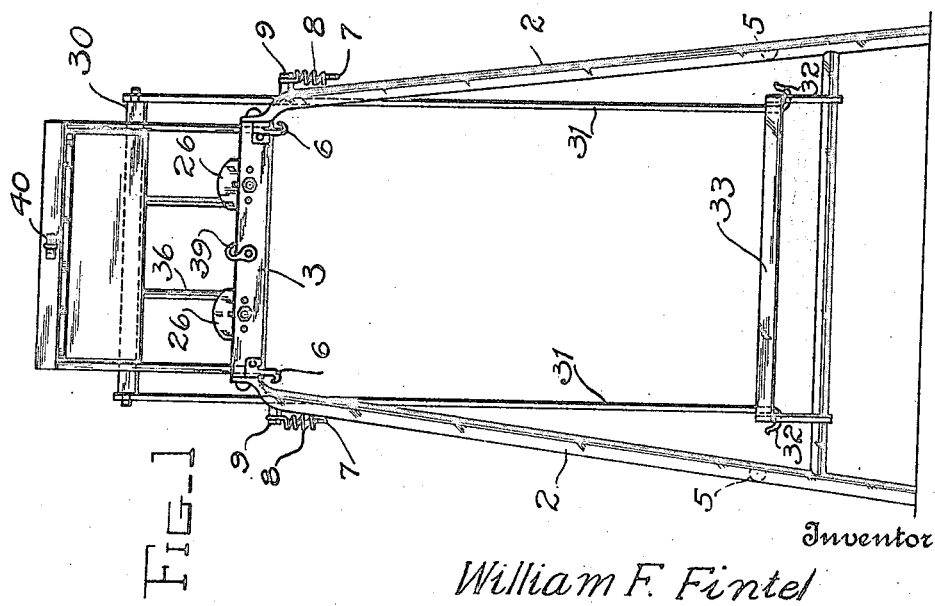
Inventor
William F. Fintel

W. F. FINTEL.
SEED POTATO CUTTER.
APPLICATION FILED MAY 31, 1921.

1,435,828.

Patented Nov. 14, 1922.
2 SHEETS—SHEET 2.

Inventor
William F. Fintel

By [signature]
Attorneys

Patented Nov. 14, 1922.

1,435,828

UNITED STATES PATENT OFFICE.

WILLIAM F. FINTEL, OF HIGHLAND, CALIFORNIA.

SEED-POTATO CUTTER.

Application filed May 31, 1921. Serial No. 473,610.

*To all whom it may concern:*

Be it known that I, WILLIAM F. FINTEL, a citizen of the United States, residing at Highland, in the county of San Bernardino and State of California, have invented certain new and useful Improvements in Seed-Potato Cutters; and I do declare the following to be a full, clear, and exact description of the invention, such as will enable others skilled in the art to which it appertains to make and use the same.

This invention relates to an improved machine for cutting seed potatoes into suitable pieces which will be planted and one object of the invention is to provide a machine of the character described having an improved frame construction and having improved cutting means consisting of stationary cutting knives and an improved pressure applying means for engaging the potatoes and forcing them downwardly against the knives so that the knives will cut through the potatoes.

Another object of the invention is to so construct the knives that certain of the knives will be provided with upwardly extending potato penetrating prongs upon which the potatoes may be placed and which will serve to hold the potatoes in proper position for cutting.

Another object of the invention is to provide a potato cutter in which the sack for receiving the cut potatoes may be suspended beneath the cutting knives in a very efficient manner and permitted of being easily and quickly put in place or removed.

Another object of the invention is to so construct this machine that the pressure board may be yieldably held in a raised or inoperative position until moved downwardly by means of a treadle having connection with the pressure board.

Another object of the invention is to provide a machine of the character described which will be cheap to produce and which will be very strong and durable.

This invention is illustrated in the accompanying drawings, wherein:

Figure 1 is a view showing the improved machine in front elevation.

Figure 2 is a view showing the machine in side elevation.

Figure 3:
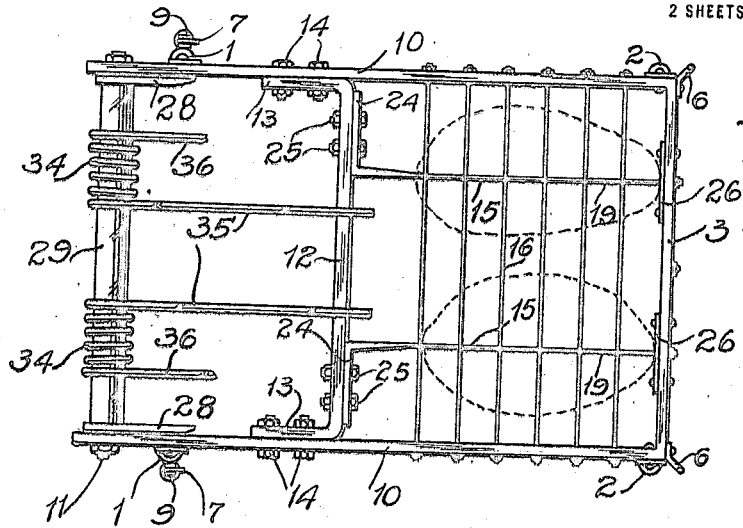
Figure 3 is a top plan view of the improved cutting machine.
Figure 4:
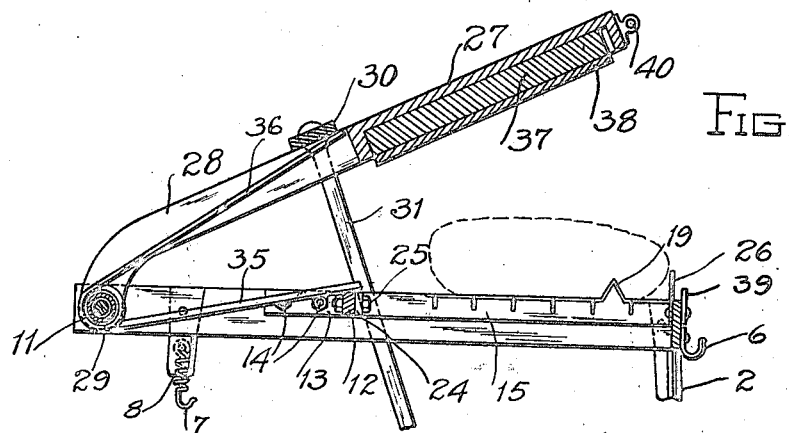
Figure 4 is a sectional view through the upper portion of the cutting machine.
Figure 5:
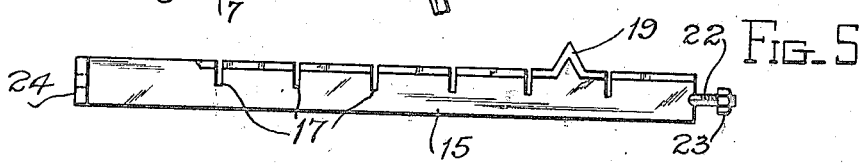
Figure 5 is an enlarged view showing one of the longitudinally extending cutting blades in elevation.
Figure 6:
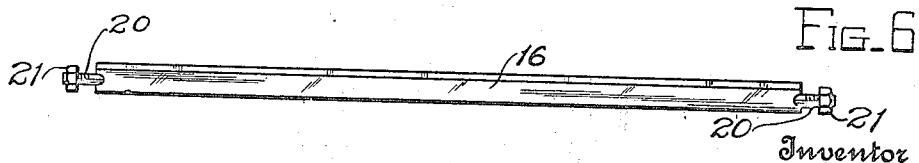
Figure 6 is an enlarged view showing one of the transversely extending cutting blades in elevation.

This improved seed potato cutting machine is provided with a frame having standards 1 and 2 which have their upper end portions connected with the knife carrying frame 3 and are braced by the cross bars 4 and side bars 5, the cross bar 4 connecting the rear standards 1 and the side bars 5 connecting the rear standards with the forward standards. Hooks 6 are connected with the knife carrying frame 3 for engagement by a potato-receiving sack and other hooks 7 which are provided with spring elements 8 are suspended from side pins 9 of the rear standards. It will thus be seen that after the sack has been connected with the hooks 6, the sack may be engaged by the hooks 7 with the springs 8 expanded and the contraction of the springs will cause the sack to be firmly held in engagement with the hooks but at the same time permit the sack to be readily disconnected when desired.

The side arms 10 of the knife carrying frame 3 have their rear end portions connected by a cross rod 11 and intermediate the length of the knife carrying frame there has been provided a cross bar 12 having arms 13 at its ends through which will pass securing bolts 14 to securely connect the cross bar with the side arms of the knife carrying frame. The blades 15 and 16 are positioned in this knife carrying frame and extend in crossed relation as shown, the blades 15 being provided with slots 17 into which the blades 16 fit so that the crossed blades 15 and 16 may have their upper cutting edges flush except for the upstanding prongs 19 of the blades 15. The blades 16 which extend transversely through the frame will each be provided at its ends with pins 20 which are threaded and pass through openings in the side bars 10 of this frame so that securing nuts 21 may be screwed upon the extended end portions of the threaded pins to securely but releasably hold the blades 16 in place. Each of the blades 15 is provided at one end with a threaded stem 22 which extends through the forward cross bar of this frame 3 and carries a securing bolt 23. The rear end portions of the blades 15 are bent to provide side arms 24 which are secured to the cross bar 12 by bolts 25. It will thus be seen that the blades will be securely but releasably held in place and will extend in crossed relation with their sharpened upper edges flush. Abutment plates 26 have been provided for engagement by potatoes which are placed upon the prongs 19. By providing these abutment plates 26, the potatoes will be prevented from extending forwardly over the forward cross bar of the frame 3 and therefore they will not be in the way when the pressure board is swung downwardly.

The pressure board 27 is in the form of a metal box provided with side arms 28 which are loosely mounted upon the cross rod 11 and held in the proper spaced relation by the sleeve 29 which fits upon the rod 11. A cross bar 30 extends from one side arm 28 to the other and is secured to the upper faces of these side arms and has its end portions extending beyond the side arms and terminating in pins upon which will fit the draw bars 31. These draw bars 31 extend downwardly and terminate in hooks 32 which are passed through openings formed in the side arms of the treadle 33. This treadle has its side arms loosely connected with the cross bar 4 which braces the standards 1 and it will be readily seen that when pressure is applied to the treadle, the pressure board will be swung downwardly. In order to yieldably retain the pressure board in a raised position, there has been provided springs 34 provided with arms 35 which engage the cross bar 12 and arms 36 which engage the cross bar 30 and will thus serve to normally retain the pressure board in a raised position and return the pressure board to the raised position when pressure upon the treadle 33 is discontinued. The pressure board is provided with a block 37 which fits into the recess or pocket formed in the underface of the pressure board and this block 37 is provided with a facing 38 formed of leather or other suitable material which will prevent the knives from being quickly dulled when the pressure board is swung downwardly to force the potatoes against the knives. It should be noted that the block 37 terminates short of the forward end of the pocket so that the plates 26 may move upwardly between the rods and the wall of the pocket.

When this machine is in use, the sack will be suspended from the hooks 6 and 7 and the potatoes which are to be cut will be placed upon the prongs 19 so that they will be held in the proper position above the crossed knives or blades 15 and 16. The treadle will then be moved downwardly by placing one foot upon the treadle and downward movement of the treadle will draw the pressure board downwardly so that the potatoes will be forced downwardly against the sharpened upper edges of the knives. The potatoes will thus be cut into sections which will pass between the knives and will drop down into the sack. After a sack is filled, it can be easily disconnected from the hooks and a new one put in place. It will thus be seen that there has been provided a potato cutting machine in which the potatoes can be easily and quickly cut into sections and further there has been provided a potato cutter which will be very efficient in operation and in which the knives can be easily and quickly removed when desired.

It will be further noted that there has been provided a hook 39 for engaging an eye 40 and holding the pressure board and treadle in a lowered position when the machine is not in use and while removing a filled sack.

I claim:

A potato slicing machine comprising a blade-carrying frame, blades carried by the frame in crossed relation, potato penetrating prongs extending above certain of said blades for holding potatoes to be cut, means for forcing the potatoes against the blades, and abutment plates carried by and within the frame and extending above the plane of the upper ends of the prongs to provide gage elements for engagement by potatoes while being placed upon the penetrating prongs.

In testimony whereof I have hereunto set my hand.

WILLIAM F. FINTEL.